United States Patent [19]
Loos

[11] 3,821,751
[45] June 28, 1974

[54] METHOD FOR WORLD WIDE SYNCHRONIZATION OF TRACKING RADARS

[75] Inventor: John C. Loos, Santa Monica, Calif.

[73] Assignee: The United States of America as represented by the Secretary of the Navy, Washington, D.C.

[22] Filed: Mar. 27, 1972

[21] Appl. No.: 238,651

[52] U.S. Cl.................. 343/5 R, 343/7.5, 343/17.7
[51] Int. Cl............................................. G01s 9/02
[58] Field of Search................... 343/7.5, 5 R, 17.7

[56] References Cited
UNITED STATES PATENTS

| | | | |
|---|---|---|---|
| 3,222,672 | 12/1965 | Forestier | 343/7.5 |
| 3,378,837 | 4/1968 | Graves | 343/7.5 |
| 3,418,579 | 12/1968 | Hultberg | 343/7.5 X |
| 3,787,665 | 1/1974 | Watson et al. | 343/7.5 X |

Primary Examiner—T. H. Tubbesing
Attorney, Agent, or Firm—Richard S. Sciascia; J. M. St. Amand; D. O'Reilly

[57] ABSTRACT

A system and method for accurately synchronizing a plurality of radar stations which are tracking the same target. The system provides a very accurate frequency standard from which epoch, i.e., "on-time", pulses can be determined. With this information accurately maintained, computer analysis can provide the proper offset from epoch time which will prevent interference or beacon stealing at acquisition. Monitoring of a radar station's transmission provides information from which PRF occurrence can be advanced or retarded to also eliminate beacon stealing.

8 Claims, 1 Drawing Figure

METHOD FOR WORLD WIDE SYNCHRONIZATION OF TRACKING RADARS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to synchronized communication systems and more particularly to a method of synchronizing a plurality of radar transmitters which are simultaneously tracking the same target.

At present, beacon stealing is a problem which can substantially affect the accuracy of data recorded during missile tracking operations. The problem could also result in tracking errors which potentially could abort a mission and even result in the loss of a very expensive missile. Beacon stealing consists of one radar station causing a second radar station to track off-target because the pulses from each are at too close an interval.

During missile tracking operations, multiple radar stations will be tracking the same target equipped with a beacon. The beacon responds to the pulses received from each radar tracking station. When the beacon responds to a pulse, there is a short recovery time before it can respond to another pulse. Thus, if a second pulse arrives at the beacon before it has had time to recover from the first pulse the second pulse return disappears. This problem could cause a second radar station to gather erroneous tracking data which if used in a range safety solution could cause needless destruction of an expensive missile. The problem is particularly acute at acquisition when the beacon can be stolen without any warning to the tracking radar.

Present solutions to the beacon stealing problem are expensive and somewhat less than satisfactory. One practice is to fly an airplane containing a beacon shortly before a missile tracking operation for radar synchronization within line of sight. This procedure involves considerable expense before each operation and does not assure prevention of beacon stealing. When the operation begins, a tracking station which does not come up on target at the proper time is out of the operation which means a loss of data. Further, a tracking station which temporarily goes off the air cannot resynchronize with the other stations. This possibility creates a tense atmosphere during tracking operations which can cause errors.

Another method of avoiding beacon stealing is for a radar tracking station to jump shift its pulse when beacon stealing is observed or suspected. This procedure is fraught with difficulties. Such phase shifting can cause considerable complications in reduction of the data gathered during the operation. Further complications result if the operator makes an error and jumps his pulse into another pulse.

The present invention provides a solution to the problem in that the radar tracking stations can very accurately space their transmissions to effectively avoid beacon stealing.

SUMMARY OF THE INVENTION

The system proposes an accurate method of scheduling radar emissions before a tracking operation begins. With some arbitrary time designated as zero time, the "on-time" pulses of an accurate frequency reference are determined. From this information, epoch pulse time "on-time" determination tables may be derived. With this information, multiple radar tracking of the same target can be performed without beacon stealing. The radar PRF's are interlaced by preplanning to eliminate or minimize beacon stealing. Each radar tracking site may have its radar pulse phase emissions accurately scheduled to an unused portion of the repetition rate interval. The radar emissions are triggered at a predetermined offset from epoch time. A tracking operation can thus be preplanned to eliminate the beacon stealing problem.

This method eliminates beacon stealing at turn-on by standardizing the pulse spacing of radars. It also extends time of tracking by multiple radars and reduces errors by eliminating the tense atmosphere created by the beacon stealing threat leading to more efficient radar operation.

Accordingly, it is an object of the present invention to provide a radar synchronization system which eliminates beacon stealing at turn-on.

Another object of the present invention is to provide a radar synchronization system which increases tracking time and thus the accuracy of data gathered by eliminating beacon stealing.

Other objects, advantages and novel features of the invention will become apparent from the following detailed description.

BRIEF DESCRIPTION OF THE DRAWING

The FIGURE is a block diagram illustrating the method of synchronization of radar tracking stations.

DETAILED DESCRIPTION OF THE PREFERRED EMBODIMENT

Figure 1:
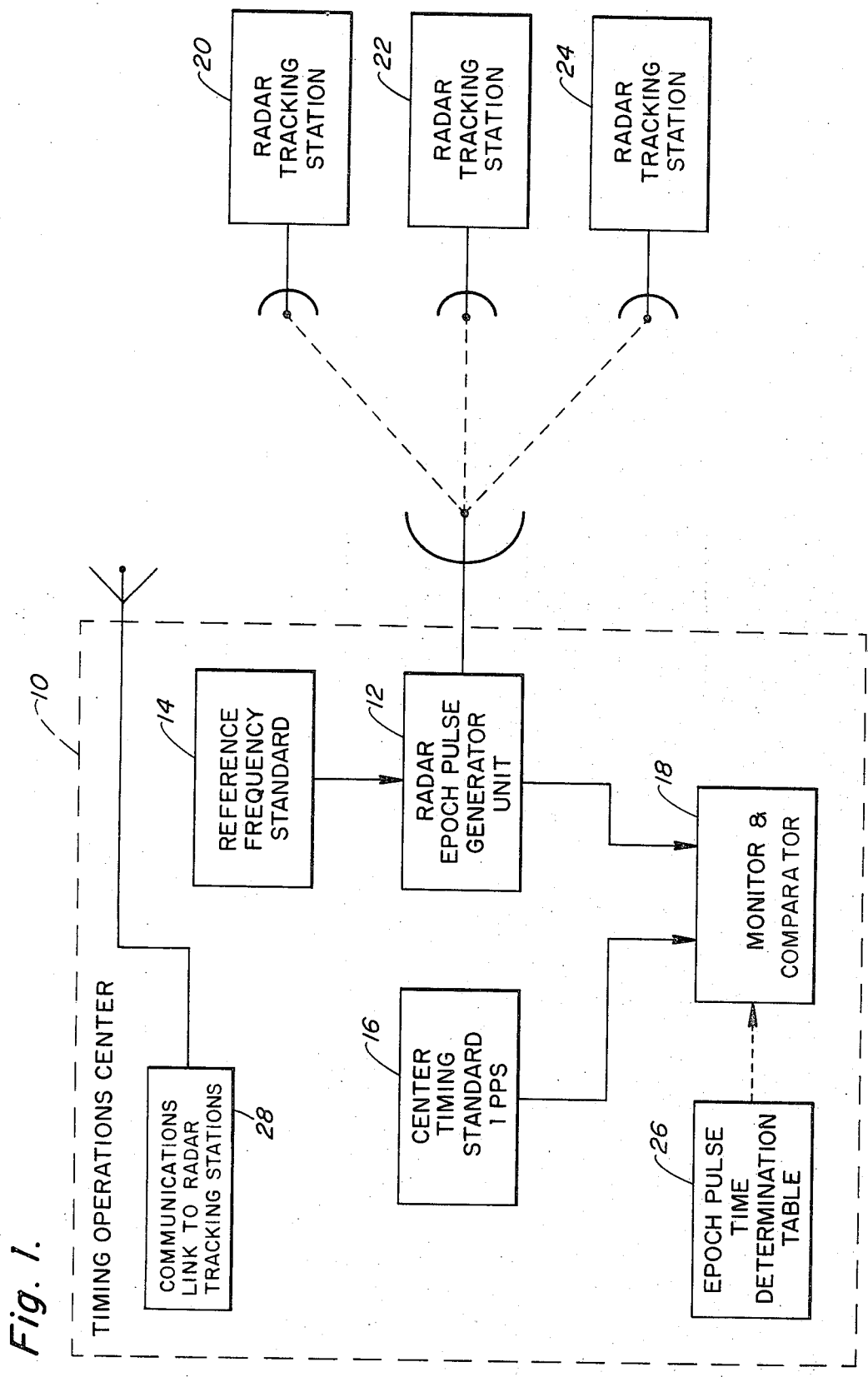

Present C-band tracking radars use a reference frequency of 81,964.270 cycles per second. The period of one cycle corresponds to the propagation time of the radar mile which is 2,000 yards. Repetition rates are derived by dividing the reference frequency by $2^7$, $2^8$, $2^9$, and $2^{10}$. This gives repetition rates of approximately 640.3459, 320.1727, 160.0865 and 80.0432 pulses per second (PPS). For a typical tracking rate of approximately 160 PPS used in this discussion, the repetition rate is 0.0865 of a pulse more than 160 each second. This means that each second the 160 pulse stream is a little bit earlier than the second before and thus difficult to synchronize with an epoch time.

The present invention utilizes "on-time" pulses designated as epoch pulse emissions for synchronization. Radar epoch pulse emissions are determined by deriving the repetition time for the first "on-time" pulse as follows.

The typical pulse rate of the radars, approximately 160 PPS, is derived by dividing the 81,964.270 Hz reference frequency by $2^9$. The exact pulse repetition rate (PRR) can be expressed as:

$$PRR = (81,964.270)/2^9 = (8,196,427)/2^9 \times 10^2 = (8,196,427)/51,200 \text{ pulses/second}$$

This fraction cannot be reduced further. The significance of this fraction is that for a pulse train starting at an "on-time" second, 8,196,427 pulses and 51,200 seconds would elapse before another "on-time" pulse occurs. This means "on-time" pulses would occur every 14 hours, 13 minutes and 20 seconds.

The epoch pulse on-time occurrence shifts from 1 day to the next, caused by the second of the 14 hour, 13 minutes and 20 second intervals overlapping into the next day. The day's overlap is found by adding these two periods together and subtracting 24 hours, which gives an overlap of 4 hours, 26 minutes and 40 seconds. The overlap for months and years is established by adding the overlaps for the total number of days involved and subtracting 14 hours, 13 minutes, 20 seconds until the answer is less than 14 hours, 13 minutes and 20 seconds, giving the smallest overlap. Doing this provides the following unit time overlaps:

| | | | |
|---|---|---|---|
| Days: | 4 hours | 26 minutes | 40 seconds |
| Months: (28 days) | 10 | 40 | 0 |
| (30 days) | 5 | 20 | 0 |
| (31 days) | 9 | 46 | 40 |
| Years: | 0 | 53 | 20 |
| Leap Year: | 5 | 20 | 0 (After 29 Feb.) |

For Leap Year, the overlap for the year is increased by the overlap for a day after Feb. 29.

Using the above values, an "Epoch Pulse Time Determination Table" was prepared. The values in the table for years, months, and days are obtained by accumulating the overlaps of the unit time periods. Whenever these exceed 14 hours, 13 minutes and 20 seconds, the result is reduced by this amount and the process continued until the table is complete. The offset for 00 seconds, 00 minutes of 0000 hours is obtained by setting 0000Z (Zulu Time), Jan. 1, 1969 as the arbitrary origin of the pulse streams of all tracking radars. This provides the 0 starting point for each section of the table. Thus, the epoch times of the on-time day will be 0 hours, 0 minutes and 0 seconds Z and 14 hours, 13 minutes and 20 seconds Z.

TABLE I

EPOCH PULSE TIME DETERMINATION TABLE

| YEAR | OVERLAP | | | AFTER 29 FEB (LEAP YEARS) | | |
|---|---|---|---|---|---|---|
| | Hour | Minutes | Seconds | Hours | Minutes | Seconds |
| 69 | 0 | 0 | 0 | | | |
| 70 | 0 | 53 | 20 | | | |
| 71 | 1 | 46 | 40 | | | |
| 72 | 2 | 40 | 0 | 7 | 6 | 40 |
| 73 | 8 | 0 | 0 | | | |
| 74 | 8 | 53 | 20 | | | |
| 75 | 9 | 46 | 40 | | | |
| 76 | 10 | 40 | 0 | 0 | 53 | 20 |
| 77 | 1 | 46 | 40 | | | |
| 78 | 2 | 40 | 0 | | | |
| 79 | 3 | 33 | 20 | | | |
| 80 | 4 | 26 | 40 | 8 | 53 | 20 |
| 81 | 9 | 46 | 40 | | | |
| 82 | 10 | 40 | 0 | | | |
| 83 | 10 | 33 | 20 | | | |
| 84 | 12 | 26 | 40 | 2 | 40 | 0 |
| 85 | 3 | 33 | 20 | | | |
| 86 | 4 | 26 | 40 | | | |
| 87 | 5 | 20 | 0 | | | |
| 88 | 6 | 13 | 20 | 10 | 40 | 0 |
| 89 | 11 | 33 | 20 | | | |
| 90 | 12 | 26 | 40 | | | |
| 91 | 13 | 20 | 0 | | | |
| 92 | 0 | 0 | 0 | 4 | 26 | 40 |
| 93 | 5 | 20 | 0 | | | |
| 94 | 6 | 13 | 20 | | | |
| 95 | 7 | 6 | 40 | | | |
| 96 | 8 | 0 | 0 | 12 | 26 | 40 |
| 97 | 13 | 20 | 0 | | | |
| 98 | 0 | 0 | 0 | | | |
| 99 | 0 | 53 | 20 | | | |
| 2000 | 1 | 46 | 40 | 6 | 13 | 20 |

TABLE I-Continued

EPOCH PULSE TIME DETERMINATION TABLE

| MONTH | OVERLAP | | | DAY | OVERLAP | | |
|---|---|---|---|---|---|---|---|
| | Hr. | Min. | Sec. | | Hr. | Min. | Sec. |
| January | 0 | 0 | 0 | 1 | 0 | 0 | 0 |
| February | 9 | 46 | 40 | 2 | 4 | 26 | 40 |
| March | 6 | 13 | 20 | 3 | 8 | 53 | 20 |
| April | 1 | 46 | 40 | 4 | 13 | 20 | 0 |
| May | 7 | 6 | 40 | 5 | 3 | 33 | 20 |
| June | 2 | 40 | 0 | 6 | 8 | 0 | 0 |
| July | 8 | 0 | 0 | 7 | 12 | 26 | 40 |
| August | 3 | 33 | 20 | 8 | 2 | 40 | 0 |
| Sept. | 13 | 20 | 0 | 9 | 7 | 6 | 40 |
| October | 4 | 26 | 40 | 10 | 11 | 33 | 20 |
| November | 0 | 0 | 0 | 11 | 1 | 46 | 40 |
| December | 5 | 20 | 0 | 12 | 6 | 13 | 20 |
| | | | | 13 | 10 | 40 | 0 |
| | | | | 14 | 0 | 53 | 20 |
| | | | | 15 | 5 | 20 | 0 |
| | | | | 16 | 9 | 46 | 40 |
| | | | | 17 | 0 | 0 | 0 |
| | | | | 18 | 4 | 26 | 40 |
| | | | | 19 | 8 | 53 | 20 |
| | | | | 20 | 13 | 20 | 0 |
| | | | | 21 | 3 | 33 | 20 |
| | | | | 22 | 8 | 0 | 0 |
| | | | | 23 | 12 | 26 | 40 |
| | | | | 24 | 2 | 40 | 0 |
| | | | | 25 | 7 | 6 | 40 |
| | | | | 26 | 11 | 33 | 20 |
| | | | | 27 | 1 | 46 | 40 |
| | | | | 28 | 6 | 13 | 20 |
| | | | | 29 | 10 | 40 | 0 |
| | | | | 30 | 0 | 53 | 20 |
| | | | | 31 | 5 | 20 | 0 |

The "Epoch Pulse Time Determination Table" is used to provide the particular epoch pulse times for any day. To obtain the epoch time for a particular hour: (1) Look up its year, month and day in the table and write down the overlaps next to the times; (2) Add the overlap numbers; (3) From this sum substract 14 hours, 13 minutes, 20 seconds and continue subtracting this until the result is between 0 and 14 hours, 13 minutes, 20 seconds; (4) Add the result to the epoch times of the on-time day. The resultant times are the epoch pulse times for the day desired.

SAMPLE CALCULATION

4 July 1976 (After Feb. 29)

| | | | | |
|---|---|---|---|---|
| Year: | 1976 | 0 hr. | 53 min. | 20 sec. |
| | July | 8 | 0 | 0 |
| | 4 | 13 | 20 | 0 |
| | | 21 | 73 | 20 which is the |
| same as | | 22 | 13 | 20 |
| substracting | | 14 | 13 | 20 |
| | | 8 | 0 | 0 |

Adding 8 hours, 0 minutes, 0 seconds to the epoch pulse times of the on-time day gives the following epoch pulse times for July 4 1976:

| | | | |
|---|---|---|---|
| | 8 hours | 0 minutes | 0 seconds (Z) |
| and | 22 hours | 13 minutes | 20 seconds (Z) |

To implement the system, a number of timing operation centers (TOC) are provided with radar epoch pulse generation units, a 1 PPS timing standard and an accurate reference frequency source. The fact that the 82 KC frequency, the radar pulse rates and the timing center 1 PPS are derived from the same cesium or rubidium frequency source and are thus coherent, leads to the accuracy of the proposed system.

By using the 1 PPS output at the TOC as a trigger and a simple tuned circuit at the radar frequency to capture the on-time burst, the offset can be determined with an oscilloscope or counter. To allow a pulse check at any time the radar epoch pulse generation unit is used. This unit generates a standard radar pulse train locked to epoch time at the TOC and operates continuously. The radar epoch pulse generation unit can be checked at up to 10 minute intervals by using a calibration table which shows times between on-time radar pulses when there is less than 10 microseconds offset.

The calibration table is derived in the following manner. The radar pulses and the timing pulses are in phase within 10 microseconds many times between the 14+ hour points of exact coincidence. These times are obtained as follows:

1. Obtain the precise PRF as indicated earlier: 8,196,427/51200 = 160.08646484375 PPS
2. Add the pulse overlap 0.08646484375, 51200 times.
3. From these 51200 overlaps, select those with a decimal portion greater than 0.9984 of a pulse.
4. The next radar pulse is less than 0.0016 of a pulse after the on time 1 PPS. The offset will be within 10 microseconds after on-time with an accuracy of 0.1 microsecond. The 0.0016 is found by dividing the decimal portion of a pulse by 160 pulses per second and multiplying by $10^6$.
5. The number of additions corresponds to seconds and is converted to hours, minutes and seconds.
6. 4 and 5 above give the 81 additional calibration points shown in Table II.

The points in Table II are used to verify on-time by triggering the scope or counter with the 1 PPS at the time indicated in Column 1 and checking the offset of the pulse with that given in Column 2. For example, the offset at 3 hours, 11 minutes and 36 seconds should be within 1.0 microsecond of on-time.

The block diagram of the FIGURE illustrates the method of synchronizing the radar tracking stations. The dotted line 10 encloses the equipment which would be maintained at one of the timing operation centers (TOC). These centers each provide a standard stream of pulses which are kept accurate in frequency and time. The standard stream of pulses are produced by the Radar Epoch Pulse Generating Unit 12. The frequency of this standard stream is kept accurate because it is synthesized from the reference frequency standard 14, which is a cesium or rubidium beam, as described above. The frequency of the Radar Epoch Pulse Generator is also identical with the frequency of transmis-

TABLE II

ADDITIONAL CALIBRATION POINTS

| TIME OF PULSE | | | MICROSECONDS | TIME OF PULSE | | | MICROSECONDS |
|---|---|---|---|---|---|---|---|
| HR | OFFSET MIN | SEC | OFFSET | HR | OFFSET MIN | SEC | OFFSET |
| 0 | 4 | 26 | 2.2 | 7 | 8 | 53 | 1.1 |
| 0 | 8 | 52 | 4.4 | 7 | 13 | 19 | 3.3 |
| 0 | 13 | 18 | 6.6 | 7 | 17 | 45 | 5.5 |
| 0 | 17 | 44 | 8.8 | 7 | 22 | 11 | 7.7 |
| 0 | 50 | 7 | 1.3 | 7 | 26 | 37 | 9.9 |
| 0 | 54 | 33 | 3.5 | 7 | 54 | 34 | 0.2 |
| 0 | 58 | 59 | 5.7 | 7 | 59 | 0 | 2.4 |
| 1 | 3 | 25 | 7.9 | 8 | 3 | 26 | 4.6 |
| 1 | 35 | 48 | 0.5 | 8 | 7 | 52 | 6.8 |
| 1 | 40 | 14 | 2.7 | 8 | 12 | 18 | 9.0 |
| 1 | 44 | 40 | 4.9 | 8 | 44 | 41 | 1.6 |
| 1 | 49 | 6 | 7.1 | 8 | 49 | 7 | 3.8 |
| 1 | 53 | 32 | 9.2 | 8 | 53 | 33 | 6.0 |
| | | | | 8 | 57 | 59 | 8.2 |
| 2 | 25 | 55 | 1.8 | | | | |
| 2 | 30 | 21 | 4.0 | 9 | 30 | 22 | 0.7 |
| 2 | 34 | 47 | 6.2 | 9 | 34 | 48 | 2.9 |
| 2 | 39 | 13 | 8.4 | 9 | 39 | 14 | 5.1 |
| | | | | 9 | 43 | 40 | 7.3 |
| 3 | 11 | 36 | 1.0 | 9 | 48 | 6 | 9.5 |
| 3 | 16 | 2 | 3.2 | | | | |
| 3 | 20 | 28 | 5.4 | 10 | 20 | 29 | 2.1 |
| 3 | 24 | 54 | 7.6 | 10 | 24 | 55 | 4.3 |
| 3 | 29 | 20 | 9.8 | 10 | 29 | 21 | 6.5 |
| 3 | 57 | 17 | 0.1 | 10 | 33 | 47 | 8.7 |
| 4 | 1 | 43 | 2.3 | 11 | 6 | 10 | 1.2 |
| 4 | 6 | 9 | 4.5 | 11 | 10 | 36 | 3.4 |
| 4 | 10 | 35 | 6.7 | 11 | 15 | 2 | 5.6 |
| 4 | 15 | 1 | 8.9 | 11 | 19 | 28 | 7.8 |
| 4 | 47 | 24 | 1.5 | 11 | 51 | 51 | 0.4 |
| 4 | 51 | 50 | 3.7 | 11 | 56 | 17 | 2.6 |
| 4 | 56 | 16 | 5.9 | | | | |
| | | | | 12 | 0 | 43 | 4.8 |
| 5 | 0 | 42 | 8.1 | 12 | 5 | 9 | 7.0 |
| 5 | 33 | 5 | 0.6 | 12 | 9 | 35 | 9.2 |
| 5 | 37 | 31 | 2.8 | 12 | 41 | 58 | 1.7 |
| 5 | 41 | 57 | 5.0 | 12 | 46 | 24 | 3.9 |
| 5 | 46 | 23 | 7.2 | 12 | 50 | 50 | 6.1 |
| 5 | 50 | 49 | 9.4 | 12 | 55 | 16 | 8.3 |
| 6 | 23 | 12 | 2.0 | 13 | 27 | 39 | 0.9 |
| 6 | 27 | 38 | 4.2 | 13 | 32 | 5 | 3.1 |
| 6 | 32 | 4 | 6.4 | 13 | 36 | 31 | 5.3 |
| 6 | 36 | 30 | 8.5 | 13 | 40 | 57 | 7.5 |
| | | | | 13 | 45 | 23 | 9.6 | sions from the radar tracking stations 20, 22, 24 because they also will be using a cesium or rubidium beam as a frequency standard.

The Radar Epoch Pulse Generator is kept accurate in time by capturing the "on-time" burst, as described above, at the time indicated by the Epoch Pulse Time Determination Table 26 and displaying it on the monitor and comparator 18, which can be an oscilloscope or counter. The 1 PPS from the center timing standard 16 should be in phase with the pulses from the Radar Epoch Pulse Generator at the times indicated in the table. The timing of the Radar Epoch Pulse Generator can be checked more frequently by monitoring the offset at the times indicated in Table II above. Less frequent monitoring of the radar epoch pulse generator will be required when no tracking operations are in progress. Radar tracking stations 20, 22 and 24 can by synchronized by illuminating the antenna of the timing operations center 10 and adjusting their radar pulses, by communications link 28, to the assigned offsets as described below. In order to provide world-wide synchronization, a number of timing operation centers would be provided at strategic geographical locations.

To synchronize a plurality of radar tracking stations during an operation, the offset for each tracking site is first determined by computer analysis. Each radar tracking site is then assigned a predetermined offset which assures non-interference at turn-on. During a tracking operation, preplanning also allows scheduled jumps, if necessary or desired, which will not cause interference. To insure the accuracy of the system, all radars would derive their 82 KHz by synthesizer from the cesium beam or stabilized rubidium reference frequency, giving a frequence accuracy of one part in $10^{11}$. This gives the radars a pulse drift of up to one microsecond per day.

Prior to a tracking operation, each radar tracking site can be checked for calibration. To accomplish this, each radar would illuminate its TOC antenna. The standard pulse stream of the radar epoch pulse time generation unit would be used for synchronization of the radar tracking stations. The calibration of the offset of the radar signal from each tracking site is accomplished with the oscilloscope or counter. That is, the radar signal from the tracking stations is compared with the standard stream of pulses from the radar epoch pulse generator on the oscilloscope or counter. By a communications link 28, between the TOC and the tracking site PRF occurrence can be directed to be advanced or retarded if the pulses are not at their assigned offset.

The proposed system provides an operationally cheaper method of radar synchronization than the present practice of flying an airplane containing a beacon for radar synchronization within line of sight or the proposed satellite method of radar synchronization. The system reduces errors in data by eliminating beacon stealing and pulse jumping to avoid beacon stealing. It provides an opportunity to more accurately determine the time of emission of radar pulses for data reduction. Computer programs can be rewritten with the exact knowledge of pulse emission. This would completely eliminate errors in the reduced data due to time.

Obviously, many modifications and variations of the present invention are possible in the light of the above teachings. It is therefore to be understood that within the scope of the appended claims the invention may be practiced otherwise than as specifically described.

What is claimed is:

1. A system for synchronizing a plurality of radar tracking stations comprising:
   means for providing an accurate reference frequency;
   means for continuously generating a standard radar pulse train having an accurate frequency and pulse rate derived from the reference frequency means;
   means for monitoring the standard radar pulse train at predetermined intervals to keep it on time; and
   means for comparing emissions from radar tracking stations with said standard radar pulse train whereby radar tracking station transmissions may be adjusted to a predetermined offset to provide non-interference during a tracking operation.

2. The synchronizing system of claim 1 wherein said monitoring means comprises:
   a 1 PPS timing standard; and
   an oscilloscope triggered by said 1 PPS timing standard at predetermined intervals.

3. The synchronizing system of claim 2 wherein said reference frequency means is a cesium beam.

4. The synchronizing system of claim 2 wherein said reference frequency means is a stabilized rubidium beam.

5. A method of synchronizing a plurality of radar tracking stations comprising:
   continuously generating a standard radar pulse train;
   deriving the frequency of said standard radar pulse train from an accurate reference frequency source;
   monitoring said standard radar pulse train at predetermined intervals to keep it on time;
   comparing emissions from a plurality of radar tracking stations with the standard stream of pulses; and
   adjusting the pulse transmissions from each tracking site to a predetermined offset from the standard radar pulse train so that interference between tracking stations is avoided.

6. The method of claim 5 wherein the standard radar pulse train is monitored by triggering an oscilloscope with a 1 PPS timing standard at predetermined intervals.

7. The method of claim 6 wherein the frequency of the standard radar pulse train is derived from a cesium beam.

8. The method of claim 6 wherein the frequency of the standard radar pulse train is derived from a stabilized rubidium beam.

* * * * *